July 28, 1959　　　C. M. NOBLE ET AL　　　2,896,854
PROTECTING DEVICE FOR WINDOW OF OPTICAL HOUSING
Filed July 10, 1956　　　　　　　　　　　　　　3 Sheets-Sheet 1

INVENTORS:
CARL M. NOBLE
CHARLES H. ANGELL
BY Silverman + Mullin
ATTORNEYS

July 28, 1959   C. M. NOBLE ET AL   2,896,854
PROTECTING DEVICE FOR WINDOW OF OPTICAL HOUSING
Filed July 10, 1956   3 Sheets-Sheet 2

INVENTORS:
CARL M. NOBLE
CHARLES H. ANGELL
BY Silverman + Mullin
ATTORNEYS

July 28, 1959 C. M. NOBLE ET AL 2,896,854
PROTECTING DEVICE FOR WINDOW OF OPTICAL HOUSING
Filed July 10, 1956 3 Sheets-Sheet 3

INVENTORS:
CARL M. NOBLE
CHARLES H. ANGELL
BY Silverman & Mullin
ATTORNEYS

United States Patent Office 2,896,854
Patented July 28, 1959

2,896,854

PROTECTING DEVICE FOR WINDOW OF OPTICAL HOUSING

Carl M. Noble and Charles H. Angell, Danville, Ill., assignors to Electric Eye Equipment Company, Danville, Ill., a corporation of Delaware Application July 10, 1956, Serial No. 596,898

9 Claims. (Cl. 239—105)

This invention relates to a device for preventing the deposition and accumulation of deleterious materials from the ambient atmosphere on windows such as used in photoelectric scanners, light sources and the like employing optical systems, the proper functioning of which would be impaired by such deposits on the window.

Photoelectric equipment and other apparatus employing optical components is often exposed to contaminating atmospheres, particularly in industrial applications. One example of this is found in photoelectric smoke detectors used in stack breechings and the like. Also in the printing industry, where registration control equipment, employing photoelectric scanners, for holding color register on high speed, multi-color presses, the atmosphere around the press is usually laden with ink mist which will rapidly coat any surface with which it comes in contact. In installations of this type on newspaper presses, for example, the problem of keeping the windows of the photoelectric scanner clean is often so acute that the registration control equipment is rendered useless in a matter of a few minutes of operation. The same problem, to a greater or lesser degree, exists in all applications in which the proper functioning of phototubes and other optical components depends upon a reasonably constant level of illumination.

In view of the above, it will be apparent that the device herein provided may be employed to advantage in a wide variety of industrial operations and other applications in which a glass or plastic window, lens or other transparent member must be maintained relatively free of deleterious materials which can be deposited from the atmosphere in which it is normally used. Therefore, although the invention can best be explained as applied to a specific problem, such explanation is not intended to limit its relatively broad scope.

In general, the invention provides means for effectively isolating the window, or other transparent member which must be kept relatively clean, from contact with the ambient atmosphere by providing an insulating curtain or stream of air or other suitable transparent gas, in the manner subsequently described.

One object of the invention is to provide a device of the general class described which is positive in its operation and can be depended upon to function properly under the most adverse conditions.

Another object is to provide such a device which is relatively simple in its construction and operation and is not difficult to produce or use.

A further object is to provide such a device which may be readily installed on existing equipment, such as photoelectric scanners, light sources and the like, as a useful adjunct thereto.

Still another object of the invention is to provide a device of the class described in which parts, such as the glass window, amenable to damage or breakage are readily accessible for inspection and repair and in which periodic thorough cleaning, which may be desirable at infrequent intervals of several months, is readily accomplished. In one preferred embodiment of the invention this can be done without disassembly of the device, by simply removing a readily detachable cover plate and without removing the device from the equipment with which it is used.

Further objects and advantages will be apparent from the subsequent description of several specific embodiments of the invention, illustrated in the accompanying drawings. For convenience in designating that portion of the illustrations embodying features provided by the invention, it will be referred to as an "air window."

Figure 2:
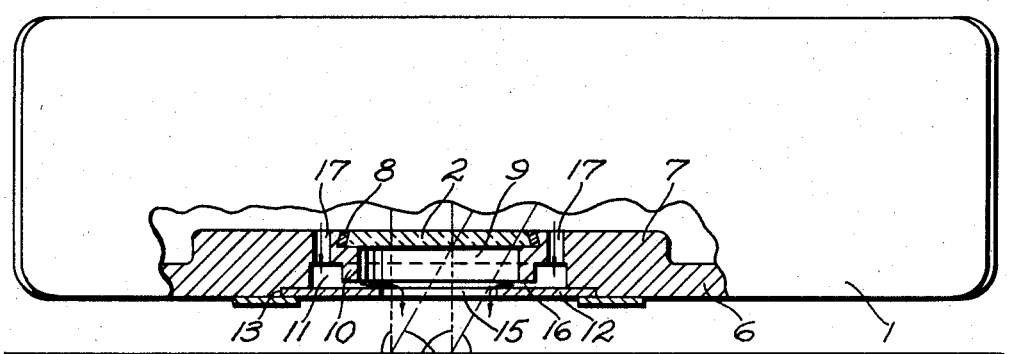
Fig. 2 is a top view of the same apparatus illustrated in Fig. 1 with the air window shown in cross section along the line 2—2 in Fig. 1.
Figure 1:
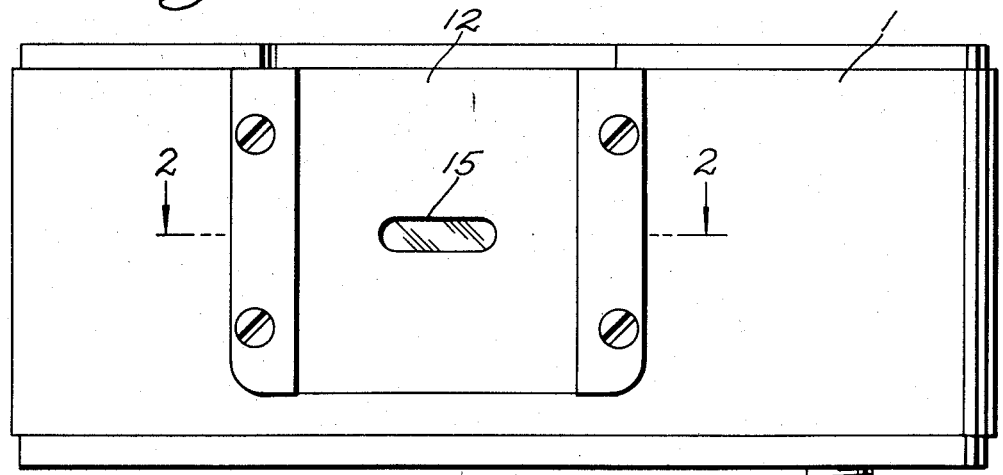
Fig. 1 is a front view of a photoelectric scanner, such as used in the control of color register in printing, in which an air window embodying the features provided by the invention has been incorporated.
Figure 3:
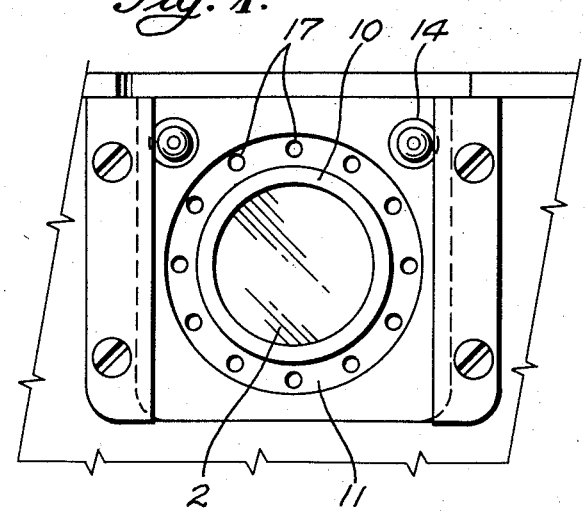
Fig. 3 is a front view of the air window shown in Fig. 1, with the cover plate removed.

Referring now to Figs. 1, 2 and 3 of the drawing:

The photoelectric scanner is designated at 1 and comprises a box-like structure housing electrical, electronic and optical components which are not a novel part of the invention and are therefore not illustrated. In this particular type of scanning equipment both the light source and the phototube are housed in the single enclosure 1, together with a projection lens for the outgoing light beam, condensing lenses for the incoming light, other optical components such as mirrors for directing the light beam in the desired paths and, usually, electronic tubes and other necessary components for one or more stages of amplification of the signal generated in the phototube by a change in the illumination of its cathode.

Such scanners are often designed to operate in a hazardous atmosphere and must be dust tight or explosion proof. In such instances, it is common practice to provide a transparent plate or disc of clear glass or plastic, such as shown at 2, through which light from a suitable source, such as an incandescent lamp housed within the scanner, is projected onto a moving web 3 of paper, boxboard, plastic film, foil, fabric or other material being printed or otherwise processed. Suitable register marks or indicia are printed, or otherwise applied, at regular intervals on the web. As these marks pass in front of the scanner, through the spot of light projected on the web from the scanner, their occurrence is detected by a phototube, also housed within the scanner. Detection of the mark results from a change in the intensity of the light beam reflected from the web back into the scanner, through the transparent member 2 and thence to the phototube as the mark passes through the illuminated spot on the web. In the case illustrated, the general path of the light beam through member 2 onto web 3 is indicated at 4 and the general path of light reflected back from web 3 into the scanner housing is indicated at 5.

Obviously, if the transparent member 2 were simply placed in or on the front wall of the scanner, it would serve its intended purpose of transmitting light to the web and reflected light or the image of the register mark back into the scanner only as long as member 2 remains clean and free of dirt, ink, oil and the like carried by the ambient atmosphere with which its outer surface comes in contact. Under operating conditions in which the atmosphere is not seriously laden with dirt, ink, oil mist and the like the member 2 can be kept sufficiently clean by wiping it with a solvent or cleaning solution perhaps once a day or so. However, under adverse conditions such as commonly encountered on newspaper presses and in many other printing operations, the exposed surface of the transparent member 2 will become fouled with deposits in a matter of a few minutes, rendering it practically impossible to operate the registration control equipment successfully.

With an air window of the design and construction shown, the transparent member 2 is effectively isolated or insulated from the ambient atmosphere by a curtain or stream of relatively clean air from any desired source.

The front wall 6 of the scanner housing 1 has a relatively thick portion indicated at 7 in Fig. 2 to accommodate the air window construction. The transparent member, which in this instance is a clear glass disc, is mounted in a depression formed on the inner side of the thickened portion 7 of the front wall and may be held in place in any desired manner, such as by suitable cement applied as indicated at 8. This material may, for example, be a mixture of litharge and glycerin applied in plastic state and allowed to harden.

A cavity or well 9 is provided in section 7 of wall 6, forward of or on the exterior side of glass 2. Although this cavity may be of any desired shape, it is circular in section in the case shown and is defined by the upstanding circular lip 10 which extends outwardly from the glass disc 2 and separates the cavity 9 from an annular recess 11 provided in section 7 of the wall 6.

A cover plate 12 is provided for the annular recess 11 and cavity 9. This cover may be held in place in any desired manner. As here shown, it is mounted to slide along its opposite edges in grooves provided, as indicated at 13, along the front of portion 7 of the scanner case. Spring loaded detents 14 exert sufficient force against cover plate 12 to normally hold it in place but permit its easy removal by sliding it upwardly out of grooves 13. An opening 15 is provided in cover 12 for passage of the light beams, as indicated at 4 and 5. This opening is preferably no larger than necessary to give the desired area of illumination on web 3 and is substantially smaller in cross sectional area than cavity 9.

It should be noted that the upstanding lip or ridge 10 which separates cavity 9 from recess 11 terminates a short distance from the inner surface of the cover 12. Thus a continuous air passageway 16 is provided to establish communication between recess 11 and cavity 9, for the purpose later explained. An air passage, comprising one or a plurality of openings 17, is provided through section 7 of wall 6 to establish communication between the interior of the scanner and recess 11 and admit air from the scanner case into recess 11.

In the particular embodiment illustrated in Figs. 1, 2, and 3 relatively clean, dry air is admitted to the scanner case through conduit 18 at a pressure greater than that of the ambient atmosphere. Air from any suitable source may be used. In most industrial applications compressed air is readily available and it is preferably supplied to the scanner through a pressure regulating valve and filter, not shown. It is desirable that the air be substantially free of oil mist, water vapor and other foreign material which might be deposited on the scanner window. By passing the air used through the scanner case before it enters the air window, it will be mildly heated by the lamp used as the light source and by other components in the case. This helps prevent the condensation of any moisture in the air. Thus, when so used, it is not necessary to completely dry the air before supplying it to the scanner. Also, this arrangement helps to stabilize the temperature of the electrical and electronic components in the scanner and, by slightly pressurizing the scanner case, prevents the leakage of dirt and hazardous vapor into the scanner, keeping the components clean and making the scanner safe to use in a hazardous atmosphere such as encountered in a rotogravure press room. When necessary or desirable due to ambient conditions, it is entirely within the scope of the invention to employ, instead of air, a gas which does not support combustion, such as nitrogen for example.

The general flow of air through the air window is shown by arrows in the drawing. It will be seen that, with a slightly superatmospheric pressure maintained within the scanner case, air will pass therefrom through the openings 17 into the distributing recess or header 11. The passageway 16, provided between the outer extremity of lip or ridge 10 and the inner surface of cover 12, is sufficiently narrow that it offers some restriction to the flow of air from recess 11. For example, the space between lip 10 and cover 12 may be of the order of five to fifteen thousands of an inch. Thus the air flow into cavity 9 adjacent cover 12 is substantially uniformly distributed about the periphery of the cavity. The main air stream or curtain then passes along the inner surface of cover 12 to the opening 15 in the latter and, in flowing out of opening 15 to impinge upon the web 3, it forms a stream or curtain which effectively prevents ambient air carrying contaminants from entering cavity 9 and contacting the transparent member 2.

It should be noted that, by virtue of the path established for the flow of air from the interior of the scanner through and out of the air window, little if any turbulence will be created in cavity 9. When opening 15 in cover 12 is so sized that the air flow therethrough is slightly restricted, as compared with the flow through passageway 16, a relatively stagnant cushion of air is created in cavity 9 at the closed-off end adjacent to the transparent member 2. Obviously the lip 10 of the section 7 of the wall 6 is imperforate so that the cover glass 2 cooperates therewith to form a cul-de-sac or dead end. Thus even with some water vapor, oil mist, dirt or the like in the air supplied through conduit 18, little if any of it will be deposited on the transparent member 2, since the latter is shielded, not only by the air stream flowing through opening 15, but also by the relatively stagnant cushion of air in the inner portion of cavity 9. However, particularly when the air is passed through the interior of the scanner, as in the embodiment shown in Figs. 1, 2 and 3, it is desirable to keep it as nearly free of deleterious materials as possible so that it will not foul the glass envelopes of the light source, the phototube, etc.

While the use of air, or other gas, compressed to superatmospheric pressure has been mentioned and it is not objectionable to use as high a pressure as ten to fifteen pounds or more, a much lower pressure of the order of one to three pounds above that of the ambient atmosphere will give excellent results in most instances. The minimum pressure required will depend upon the relative cross sectional areas of conduit 18, openings 17, the passageway 16 and opening 15 as well as the space between cover plate 12 and the web 3. With a reducing valve or pressure regulator, not shown, between conduit 18 and the air supply tank or compressor the air pressure to the scanner may be readily adjusted to suit requirements and, once the minimum suitable pressure has been determined for any given installation, the setting need not be altered.

Figures 4, 5:
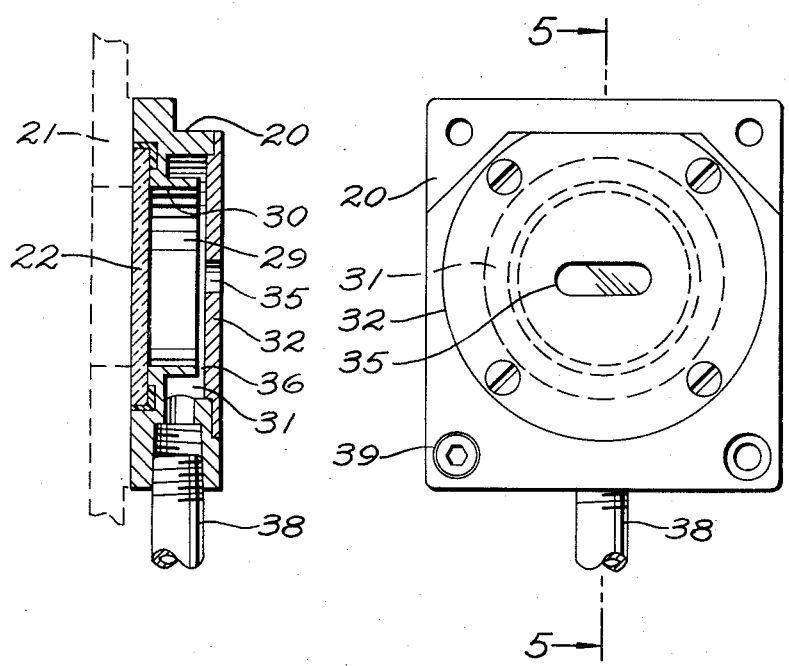
Figs. 4 and 5 are, respectively, a front view and a sectional view, taken along line 5—5 in Fig. 4, of another embodiment of the invention.

Referring now to Figs. 4 and 5, these figures illustrate one embodiment of an air window designed for ready attachment to existing scanners, light sources, and the like, to obviate providing a new case for the latter having an integral air window.

The construction and arrangement of the air window shown in Figs. 4 and 5 is essentially the same as that shown in Figs. 1, 2 and 3. The main body or frame of the window structure is designated at 20 and may be cast, machined or otherwise formed from metal, preferably aluminum or brass, or from a thermoplastic or thermosetting resin. The transparent member 22, cavity 29, lip or ridge 30, groove or recess 31, cover 32 with its opening 35, and passageway 36 correspond to parts and air passages of the same terminology in Figs. 1, 2 and 3. The essential difference, aside from being non-integral with the case, designated at 21 in Figs. 4 and 5, is that instead of supplying the air through the case it is supplied directly to the groove or recess 31 through a suitable tube or conduit 38 attached to the body 20 of the air window.

Although the air window shown in Figs. 4 and 5 may be attached to the structure 21, with which it is used, by welding, brazing or in any other desired manner, it is here shown as attached by the machine screws 39.

Figure 6:
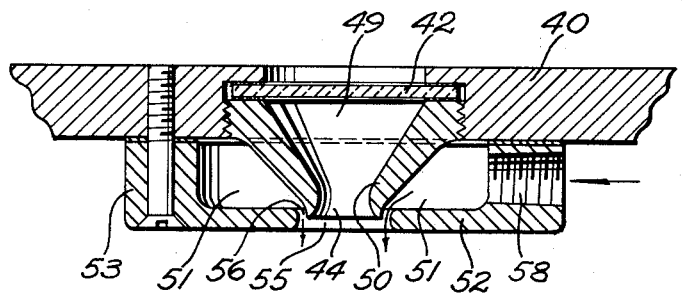
Fig. 6 is a cross sectional view of another form of the device provided by the invention.

Referring now to Fig. 6, which is a cross sectional view, corresponding to views 2 and 5, of another specific form of the invention, the front wall of the housing for the optical components not shown, which are to be protected, is designated at 40 and incorporates a cavity 49 which is larger in cross section adjacent to the transparent member 42 than at the opening 44 at its outer extremity. As in the previously described embodiments of the invention, the side wall of the cavity 49 of Fig. 6, formed by the ridge or lip 50, extends to adjacent with and does not touch the inner surface of cover 52. In this instance, the air distributing duct or groove 51 is formed by the space provided between lip 50 and the rim section 53 of the cover. Air admitted to duct 51, through conduit connection 58, flows through the restricted passageway 56 and out of the air window through the opening 55 in cover 52.

It will be noted with reference to Fig. 6 that the outer extremity of cavity 49, comprising the neck 44 is smaller than the opening 55 in the cover. Thus air flowing from the passageway 56 and out through opening 55 will tend to draw air from and create a partial vacuum in cavity 49, instead of pressurizing the cavity with a stagnant cushion of air. This construction is advantageous when a relatively small opening, at 44, is sufficient for passage of the light beam.

Figure 7:
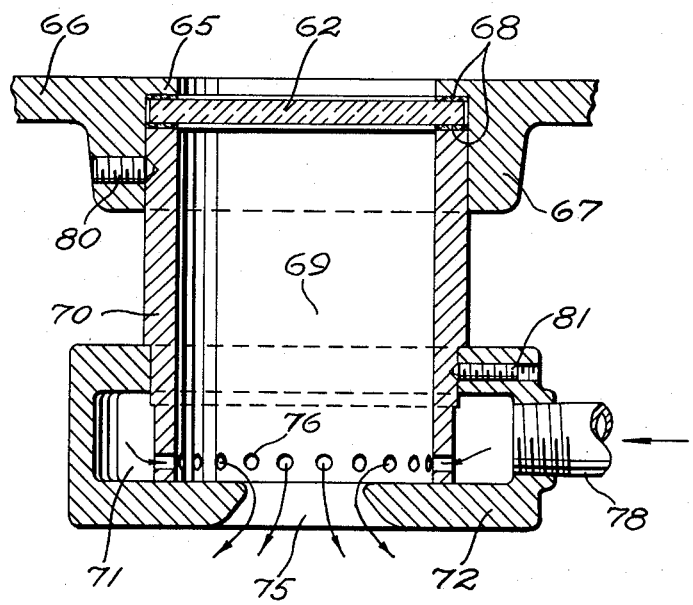
Fig. 7 is a cross sectional view of still another form of device incorporating the features of the invention.

The embodiment of the invention shown in Fig. 7 will be found advantageous with smoke detectors, for example, and other applications in which the light beam is projected over a substantial distance, i.e. when a scanner of relatively long focal length is employed. In such instances, it is common practice to separately house the light source and the phototube or photocell and the invention definitely contemplates the use of an air window on each of the enclosures containing optical components.

In Fig. 7 a portion of one wall of the structure, comprising the housing for the components to be protected by the air window, is designated at 66 and has a boss or raised portion 67 for the reception of the tubular member 70 which replaces the lip or ridge of Figs. 2, 5 and 6 and is of greater length. Thus the space 69 within tube 70 corresponds to the cavity 9 of Figs. 2 and 5 but is also of greater depth. The transparent member 62 is disposed, in this instance, between the inner end of tube 70 and the flanged section 65 of wall 66 and suitable gaskets 68 are preferably provided to seal the joints and prevent breakage of member 62. The tube may be held in place in boss 67 by one or more set screws 80 or it may be threaded, rolled or otherwise attached to the boss.

As in the construction illustrated in Fig. 6, the air distributing duct or groove 71 of Fig. 7 is formed within the cap or cover member 72 which is secured to tube 70, in the case illustrated, by one or more set screws 81. An opening 75 is provided through the end of cap or cover 72 and is preferably flared outwardly from the cavity 69.

In Fig. 7, instead of terminating tube 70 short of the cover 72, it is seated against the latter and communication between the air distributing duct 71 and the outer end of cavity 69 is established by providing a plurality of openings 76 through the wall of tube 70 adjacent to its outer end. Either type of construction may be used, since it is not necessary that the air passageway between the air distributing duct and the cavity be continuous, so long as good air distribution into the cavity is obtained.

Air supplied to duct 71 of Fig. 7 through the conduit 78 flows through the restrictive openings 76 into the lower portion of cavity 69 and out of the air window through opening 75 in cover 72, as indicated by the arrows.

When used with such devices as smoke detectors, where the interruption or diminution of light passing from a light source, through the products of combustion, to a photosensitive element indicates the presence of smoke, it is not desirable to greatly dilute the flue gases or other medium undergoing inspection with air. The construction of the air window shown in Fig. 7 illustrates one means of preventing such excessive dilution in the inspected area without hampering the proper functioning of the air window. It will be noted with reference to the arrows in Fig. 7 that the air passing through opening 75 tends to spread outward from the central portion of the opening so that it is rapidly dissipated in the stream of combustion products flowing past the air window. Thus, with the light housing and the phototube housing spaced a substantial distance apart, as on diametrically opposite sides of a stack breeching, no appreciable dilution will occur in the main body or core of the combustion gas stream. Still by virtue of the depth of cavity 69, the restricted opening 75 and the air cushion maintained in the cavity, little or no gases from the ambient atmosphere will find their way to the inner extremity of the cavity and contact the glass 62.

Although the device provided by the invention is referred to, for the sake of brevity, as an "air window" and, for the same reason, the term "air" has been used to designate the gaseous medium used in the device for insulating or effectively isolating the transparent member from the ambient atmosphere, the term "air" as used in the specification and claims is not intended to preclude the use of any other desired transparent gas or gaseous mixture, within the scope of the invention.

We claim:

1. In a device of the character described having a body with a transparent light-transmitting member therein, imperforate wall means surrounding the transparent member and extending outwardly from the said body and together with said transparent member defining a closed-end cavity, closure means at the entrance of said cavity directly opposite the closed end and having a restricted opening therein communicating with the ambient atmosphere substantially smaller in area than the area of said transparent member, a gas distributing duct surrounding said wall means on the exterior thereof and having restricted passage means providing communication with said cavity adjacent said restricted opening, said restricted passage means being arranged to direct gas uniformly about the periphery of said cavity and out of said restricted opening in a movement carrying said gas directly away from said transparent member, and means for introducing transparent gas, such as air, into said duct at a pressure greater than that of the ambient atmosphere.

2. In combination with a housing having optical means therein including at least a portion of a photoelectric scanner, said housing having a wall and a light transmitting member mounted in said wall, means for protecting the light transmitting member from contamination by the ambient atmosphere exterior of the housing comprising an imperforate upstanding lip secured to the wall surrounding the light transmitting member and forming therewith a closed-bottom well exterior of the housing, the light transmitting member being the bottom of the well, a gas distributing duct surrounding the well and having communication with the interior of the housing such that gas introduced into the housing will emerge into said duct, a closure over the well spaced from the light transmitting member having a central restricted opening to the ambient atmosphere, and restricted gas passage means between the well and said duct adjacent said closure.

3. The device as defined in claim 2 in which the closure is detachably secured to said wall to give ready access to the interior of said well and duct.

4. A window structure for use in an optical apparatus of the character described for maintaining a substantially constant level of illumination, comprising a hollow body having peripheral walls and a light transmissive member closing one end of the body and having its optical axis generally coincident with the geometric axis of the body parallel with the walls thereof, said structure having means providing a gas conduit exterior of the walls, closure means at the second end of the body opposite the light transmissive member and having an opening therein of substantially smaller area than the area of said light transmissive member which is subtended by the interior of said walls, means connected with said conduit for introducing a transparent gas into said conduit at a super-atmospheric pressure, and passageway means from said conduit to the interior of said hollow body disposed circumferentially relative said hollow body adjacent said closure means and directionally arranged to pass a curtain of said gas over the end of the interior of said hollow body, the gas adapted thereafter to pass out of said opening.

5. A window structure for use in an optical apparatus of the character described for maintaining a substantially constant level of illumination, comprising a hollow body having peripheral walls and a light transmissive member closing one end of the body and having its optical axis generally coincident with the geometric axis of the body parallel with the walls thereof, said structure having means providing a gas conduit exterior of the walls, the walls terminating in a plane spaced from said light transmissive member, closure means over the second end of said hollow body but slightly spaced from said plane to form a restricted circumferential passageway providing communication between said gas conduit and the interior of said body, an opening in the closure of area smaller than the interior cross section area of said body to relieve said gas, and means connected with said conduit for introducing a transparent gas into said conduit.

6. A window structure for use with an optical apparatus and comprising an open ended hollow cylinder, a light transmissive member closing off one end and the second end being open, a generally planar closure member mounted on said second end but slightly spaced from the end to provide a circumferential restricted passageway between itself and said second end, a central opening in the closure of area substantially less than the cross sectional area of the interior of the cylinder, an enclosed annular duct adjacent said second end coaxial with said cylinder and arranged exterior thereof and connected with said restricted passageway, and means connected with said conduit for introducing a transparent gas to said annular duct.

7. A structure as claimed in claim 6 in which there is provided an integral body member and said cylinder and duct are formed in said body both opening outward relative said light transmissive member, and said closure member is removable and has portions covering said duct to enclose the same.

8. A device of the class described having a housing provided with a member through which light is transmitted and means for preventing deterioration of the light transmission through said member comprising a wall circumscribing and extending outwardly from said member to form a cavity closed at the end adjacent said light transmitting member and separating said member from the ambient atmosphere, said cavity having a restricted opening at the end thereof directly opposite said member, a duct being provided in said device separated from said cavity and having communication with said cavity only adjacent the said open end thereof, at least one entrance being provided in the duct for the introduction thereinto of transparent gas, such as air at a pressure above that of the ambient atmosphere, said communication between said cavity and duct being so constructed and arranged that a stream of gas from said duct is directed outwardly from said opening in a direction carrying said gas away from said light-transmitting member, and forming a barrier between the latter and the ambient atmosphere.

9. A device of the class described having a body in which a cavity is provided, a transparent member disposed in said cavity adjacent one end thereof and fully closing same off, means covering said cavity at its opposite end and having provided therein a central opening of substantially smaller cross sectional area than that of the cavity at its closed-off end, an air distributing duct being provided in said device separate from and disposed about the exterior of said cavity, at least one opening being provided into said duct for the admission thereto of transparent gas, such as air, at a pressure greater than that of the ambient atmosphere, said duct and said cavity being so connected adjacent said covering means as to distribute gas emerging from the duct substantially uniformly about the periphery of the cavity and to direct same out of said opening in the cover in a movement away from said transparent member wherein the said covering means comprises a plate member disposed over the end of said cavity and said body has guide means securing said plate member in position and readily slidable thereto to remove the said plate member and give access to the interior of said cavity for cleaning the same.

References Cited in the file of this patent

UNITED STATES PATENTS

| | | |
|---|---|---|
| 624,656 | Jobson | May 9, 1899 |
| 1,647,138 | Kirkwood | Nov. 1, 1927 |
| 2,494,480 | Mac Master | Jan. 10, 1950 |